United States Patent [19]

Stumpe

[11] 4,421,151
[45] Dec. 20, 1983

[54] TIRE-PRESSURE REGULATING SYSTEM

[75] Inventor: Werner Stumpe, Kornwestheim, Fed. Rep. of Germany

[73] Assignee: Robert Bosch GmbH, Stuttgart, Fed. Rep. of Germany

[21] Appl. No.: 354,579

[22] Filed: Mar. 4, 1982

[30] Foreign Application Priority Data

Mar. 5, 1981 [DE] Fed. Rep. of Germany ....... 3108247

[51] Int. Cl.³ .............................................. B60C 23/10
[52] U.S. Cl. ..................... 152/417; 137/224; 137/625.64; 141/38; 141/46; 141/94; 141/198; 152/416
[58] Field of Search ............... 152/417, 416, 415, 427, 152/429; 141/38, 46, 47, 94, 192, 198; 137/224, 225, 625.64, 625.65; 417/231

[56] References Cited

U.S. PATENT DOCUMENTS 2,685,906 8/1954 Williams .............................. 152/417
4,313,483 2/1982 Brockmann ......................... 152/416

FOREIGN PATENT DOCUMENTS 2141553 2/1973 Fed. Rep. of Germany.
2736603 8/1980 Fed. Rep. of Germany.

Primary Examiner—William A. Powell
Assistant Examiner—Thomas Bokan
Attorney, Agent, or Firm—Edwin E. Greigg

[57] ABSTRACT

A tire-pressure regulating system is proposed with which the air pressure in the vehicle tires can be varied while driving. The tires are connected to supply lines in which rotor connections, control valves, flow restrictive elements and an adjustable regulating valve are disposed. A relay valve and an axle valve are incorporated following the regulating valve.

By means of guiding the supply line in and at the axle valve in a particular manner, an acceleration of the pressure equalization process is attained.

The tire-pressure regulating device is preferably usable in trucks and trailer trucks.

6 Claims, 1 Drawing Figure

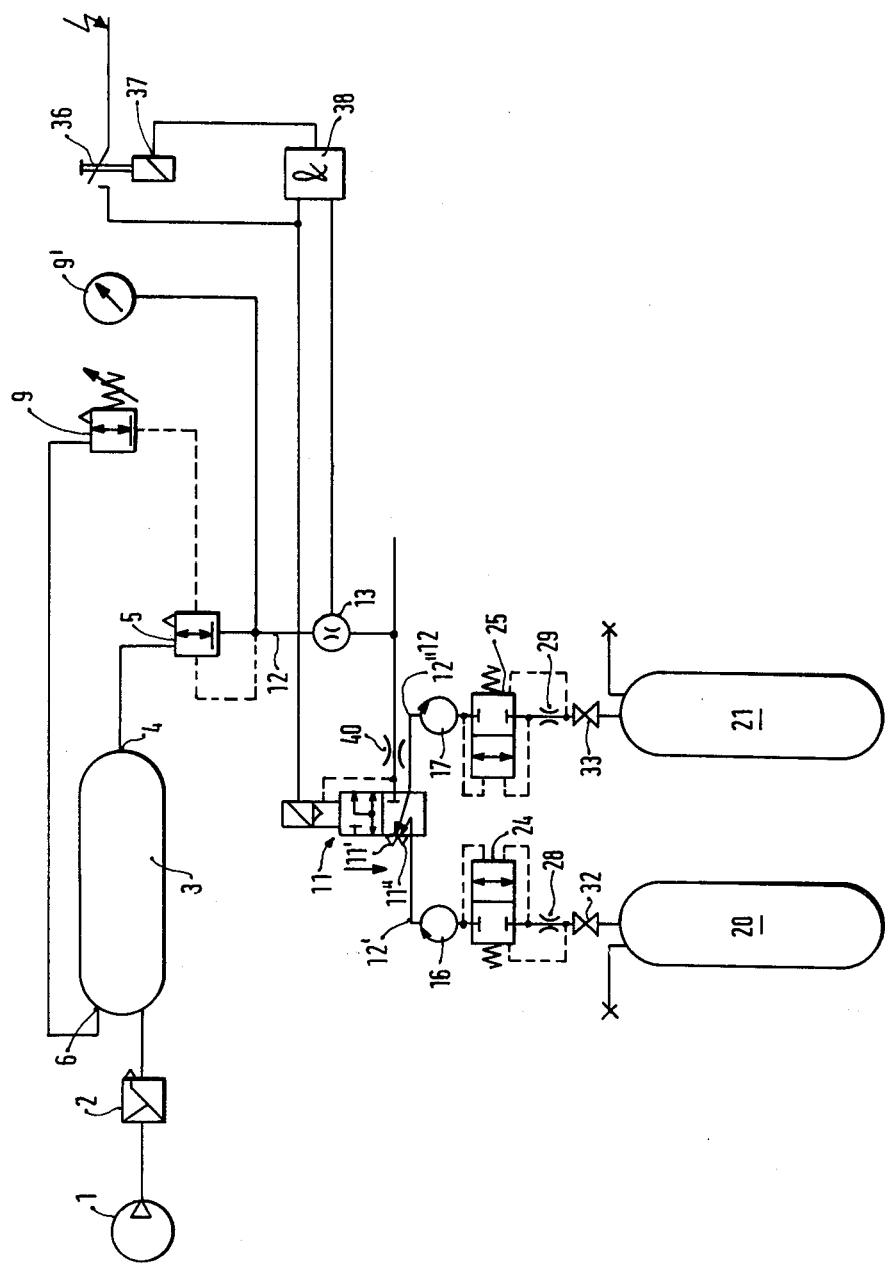

TIRE-PRESSURE REGULATING SYSTEM

BACKGROUND OF THE INVENTION

The invention is based on a tire-pressure regulating system. A system of this kind is known from German Auslegeschrift No. 26 30 511.

In this known system, a measurement of pressure per se takes place in the supply line. Since the pressure sensors either cannot be disposed in the vehicle wheels or can be so disposed only with great difficulty, the known regulating system necessarily requires a waiting period until a complete pressure equalization has taken place, before one can obtain some idea of the new pressure more recently attained. In other words, a maintenance function without any supply or withdrawal of air must be attained. Only then is it possible to effect follow-up regulation, and only after such an adjustment has brought about, the desired tire pressure can the supply line be bled, this bleeding being important in order to relieve the pressure on the rotor connections disposed on the wheels, and thus to reduce friction.

It is true that another known regulating system (German Auslegeschrift No. 27 36 603) is equipped with a timer switch which shuts off the pressure variation which has been determined empirically after a set period of time. However, there are various adjustment variables which change the filling time—for instance, the supply pressure at a particular time—and another factor is whether the compressor which feeds the supply container feeds air directly via this container into the tires, or not. For instance, if the vehicle has been shut off in the meantime and the equalization of pressure had not yet been completed upon vehicle shutoff, then after several such cycles, a shift in the pressure level in the tires takes place.

Finally, it is also already known from German Offenlegungsschrift No. 21 41 553 that the regulating process can be automatically interrupted via a timer switch once a certain tire pressure has been attained.

OBJECT AND SUMMARY OF THE INVENTION

The tire-pressure regulating system has the advantage over the prior art that the process of pressure equalization is accelerated substantially, especially in the case of relieving the supply line. As a result, the regulating times are shortened.

In addition, an overall higher air throughput through the control valves can be attained. A further advantage is that two different air quantities can be directed; that is, one air quantity, intended for relieving the rotor connections, is substantially higher (approximately twice as high) than that intended for reducing the tire pressure. During tire pressure reduction, the control valve remains opened. The higher air throughput during bleeding, however, produced a closing force in the control valve which is further reinforced by the built-in spring, so that the valve reliably attains its closing position.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention which will be described in further detail below.

DESCRIPTION OF THE PREFERRED EMBODIMENT

A tire-pressure regulating system has a compressor 1, which supplies compressed air to a supply container 3 via a pressure limiter 2. A relay valve 5 having a large passageway cross section is connected to the container 3 via a terminal 4. When there is a pressure indication by means of a manometer 9', a regulating valve 9 which triggers the relay valve 5 is supplied with air by way of a second terminal 6 on the supply container 3.

The regulating valve 9 is a pressure control valve, at which the tire pressure is pre-selectable, ranging from 1 to 5 bar, for instance. A pressure-actuated 3/2-way axle valve 11 is disposed following the relay valve 5. This valve 11 is connected to a supply line 12 in which a flow sensor 13 is connected. After the axle valve 11, the supply line 12 is subdivided into two line branches 12' and 12" which are connected with rotors 16, and 17 one for each wheel 20, 21. The axle valve 11 either connects the supply line 12 with the line branches 12', 12", or it blocks the supply line 12 while simultaneously connecting the line branches 12', 12" to a relief means 11', 11". Following the two rotors 16 and 17, the system incorporates one 2/2-way control valve 24, 25, venturi or flow restrictive means 28, 29 and one shutoff cock or valve 32, 33 for each wheel 20, 21. The control valves 24, 25 are pressure valves and are adjusted in adaptation to the regulating valve 9 such that at pressures higher than 1 bar they are open, while when the pressure in the supply line 12', 12" is lower than 1 bar they assume the shutoff position.

The axle valve 11 is electrically connected to a control switch 36, which like the regulating valve 9 is disposed in the passenger compartment of the vehicle. The switch 36 has two positions, "zero" and "pressure", and is coupled with a holder magnet 37. The holder magnet 37 is connected with the flow sensor 13 via an electronic control unit 38.

Mode of Operation

The driver pre-selects a desired tire pressure, either in increments or continuously, with the regulating valve 9. This pressure is delivered from the relay valve 5 via the supply line 12 to the axle valve 11 and is indicated to the driver at the manometer 9'.

If the driver decides to bring the tire pressure to the pre-selected pressure, then he actuates the switch 36. The magnet of the axle valve 11 switches over to this pressure, and the supply line branches 12' and 12" leading to the valves 24 and 25 are placed under pressure. The valves 24 and 25, under the effect of the pressure, switch over to the open position, counter to the spring force. Air from the supply container 3 flows via the relay valve 5, the axle valve 11 and the valves 24, 25 into the tires 20, 21 and fills the tires to the selected level. When there is a reduction of pressure in the tires 20, 21, the air flows through the relay valve 5 to the outside. The flow sensor 13 indicates a flow process to the electronic control unit 38, and the holder magnet 37 holds the switch 36 in the closed position.

If the tire pressure has adjusted to the preselected pressure, then no further air flows between the relay valve 5 and the tires 20 and 21. The electronic control unit 38, by means of the sensor 13, recognizes the signal for "no flow", and the holder magnet 37 is switched off. The switch 36 opens and assumes its position of rest. The axle valve 11, now lacking electrical current, likewise switches back to its initial position and bleeds the supply line branches 12', 12''. The valves 24 and 25 close, under the effect of the higher flow velocity; this velocity had previously been less because, in the case of pressure reduction via the relay valve, for instance, a backup of pressure was caused by the pre-selected pressure and by the effective combination of the two supply line branches 12' and 12'' into the one supply line 12, whose inside diameter was of equal size. The same effect as set forth just above can also be attained by means of a supplementary throttle 40 at the axle valve 11 or between the axle valve 11 and the relay valve 5.

The two control valves 24 and 25 disposed on the wheels 20 and 21 are 2/2-way valves having at least one throttle restriction, embodied by the venturi means 28 and 29. The effect of the tire pressure is compensated for on the closed valve 24 or 25. The opening pressure of the valve 24 or 25 counter to the spring force is somewhat below the minimum permissible tire pressure.

Depending on the level of the pre-selected pressure and the actual tire pressure, the air flows either into or out of the tires. The throttle in the valve 24 or 25 is dimensioned such that it presents little resistance to the normal filling and emptying of the tire. When pressure in the tire is being reduced, the air quantities leaving the tires are combined at the axle valve 11. The quantity flowing through the common line determines the flow velocity at the wheel valve. Since in this case there is virtually no throttling at the wheel valve, the pressure in the line up to the axle valve 11 is approximately equal to the tire pressure.

If the rotor connection 16 or 17 is relieved by the reversal of the axle valve 11, a substantially higher quantity of air could flow out of each tire 20 and 21. However, this causes a pressure drop at the throttle in the valve 24 or 25, which additionally acts upon the valve 24, 25 and closes the valve. The wheel supply lines 12, 12' are bled completely and the spring force holds the valve 24 or 25 closed.

In known tire-pressure regulating systems, the control valves disposed on the tire close at low pressures because of spring force. To this end, a severe throttling must be effected between the tire and the valve. This throttling is attained by the appropriate embodiment of the wheel valves. However, because of this throttling, which is either constant or self-regulating, the air throughput is correspondingly low and the regulating times are very long.

In the tire-pressure regulating system according to the invention, a substantially higher air throughput is possible. The switching of the axle valve 11 means that two very different air quantities can be controlled, which reinforce the switching process. The air quantity for relieving the rotor connections 16 and 17 to the wheels is substantially higher (when identical line cross sections are combined, approximately twice as high) than in the case of tire pressure reduction. When the tire pressure is being reduced, the control valves 24 and 25 disposed on the wheels remain opened. The higher air throughput during bleeding then results in a high closing force at the valves 24 and 25, because of the pressure drop at the throttles 28, 29; this closing force is reinforced by the compression spring and assures reliable and rapid closure of the valve.

The foregoing relates to a preferred exemplary embodiment of the invention, it being understood that other embodiments and variants thereof are possible within the spirit and scope of the invention, the latter being defined by the appended claims.

What is claimed as new and desired to be secured by Letters Patent of the United States:

1. A tire-pressure regulating system for varying the pressure in vehicle tires while driving, said system includes a compressed-air supply device which is connected with said vehicle tires via a supply line, said system further including rotor connections, control valves, flow restrictive means and an adjustable regulating valve, as well as a shut-off valve and an axle valve being disposed downstream of said regulating valve, characterized in that said axle valve is connected to said supply line on an inlet side and to a pair of branch supply lines on its outlet side, said axle valve having two switching positions, and further wherein in one switching position of said axle valve said pair of branch lines are connectable to the supply line leading back to a relay valve and in the other switching position the branch lines are connectable to a relief means.

2. A tire-pressure regulating system as defined by claim 1, characterized in that said supply line has approximately the same cross section as said supply branch lines.

3. A tire-pressure regulating system as defined by claim 1, characterized in that said supply line further includes a throttle means.

4. A tire-pressure regulating system as defined by claim 1, characterized in that said relief means is embodied separately for each supply branch line.

5. A tire-pressure regulating system as defined by claim 1, characterized in that said control valves utilize a pressure drop from said flow restrictive means as an aid to switching.

6. A tire-pressure regulating system as defined by claim 2, characterized in that said relief means is embodied separately for each supply branch line.

* * * * *